Patented Nov. 15, 1949

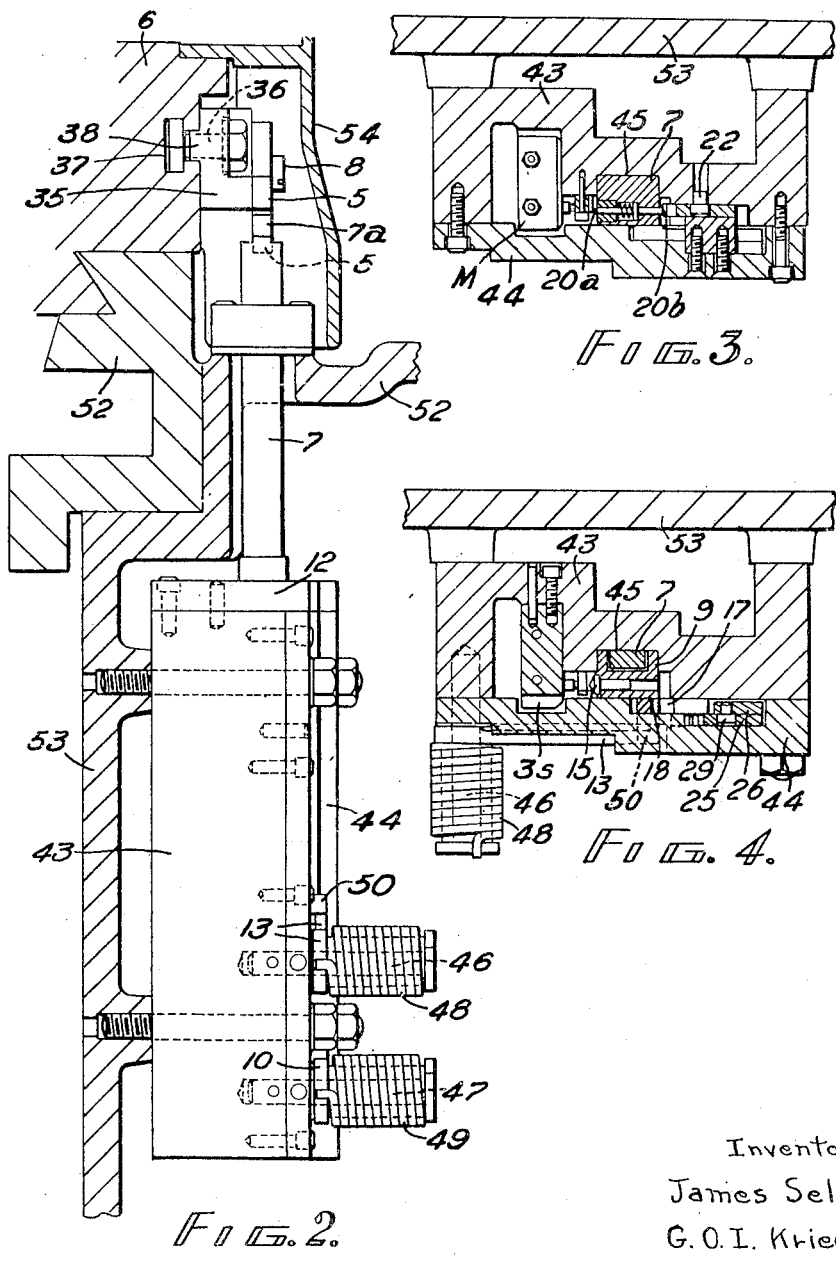

2,488,337

UNITED STATES PATENT OFFICE 2,488,337

ELECTRIC CIRCUIT CONTROLLING APPARATUS

James Selby, Hatch End, and Gerhard Otto Isaac Krieger, Berkhamstead, England, assignors to Victoria Machine Tool Company Limited, London, England Application June 5, 1947, Serial No. 752,746
In Great Britain October 16, 1945

Section 1, Public Law 690, August 8, 1946
Patent expires October 16, 1965

9 Claims. (Cl. 171—97)

1

This invention relates to electric circuit controlling apparatus, and refers particularly but not exclusively to electric circuit controlling apparatus for effecting selected cycles of movements say of the work tables or the like of machine tools, such as milling machines. As is well known it is frequently required to give such work tables a selected cycle of movements, for example a feed-left movement, a feed-right movement, a quick-travel-left movement, and a quick travel right movement, and it may be required to change from any of said movements to any other at any preselected position of the table.

The object of the invention is the provision of improvements in such apparatus, by which among other advantages the preselecting or presetting operation is rendered much simpler than heretofore.

The invention consists broadly of electric circuit controlling apparatus comprising a plurality of controlled circuits to be selected, a control element adapted to be moved from a normal position along a given path to any of a plurality of selecting positions at different distances and back again, and means whereby, in response to each reciprocation of said control element to a selecting position and back, a controlled circuit corresponding to said selecting position is established, and any circuit which was established in response to the preceding reciprocating is disestablished.

In order that the invention may be the more clearly understood an apparatus in accordance therewith for effecting selected cycles of movement of the work table of a milling machine will now be described, reference being made to the accompanying drawings wherein—

Figure 2 is an elevation looking from the left of Figure 1.

Figure 3 is a section plan on line III—III of Figure 1.

Figure 4 is a sectional plan on line IV—IV of Figure 1.

Figure 1:
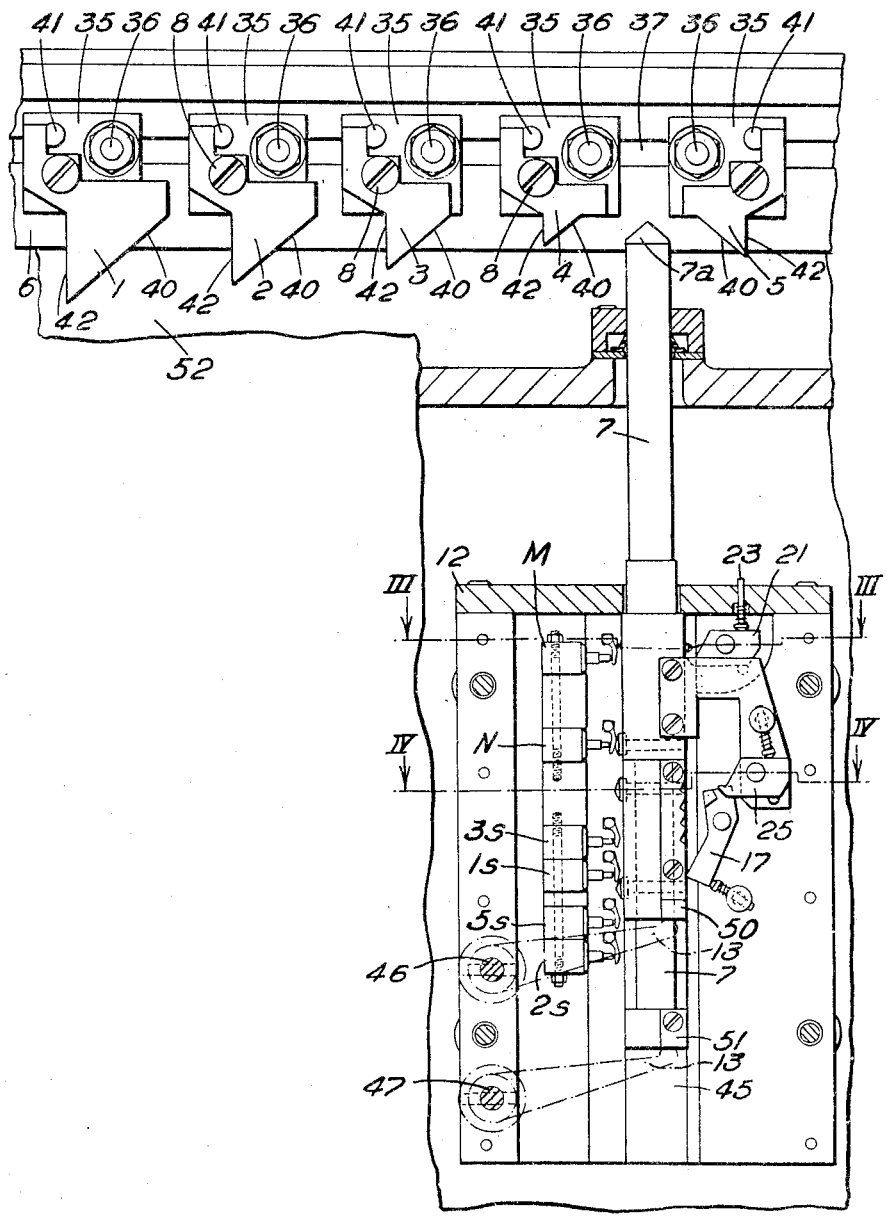
Figure 1 is a side elecation of said apparatus with a cover plate removed.
Figure 5:
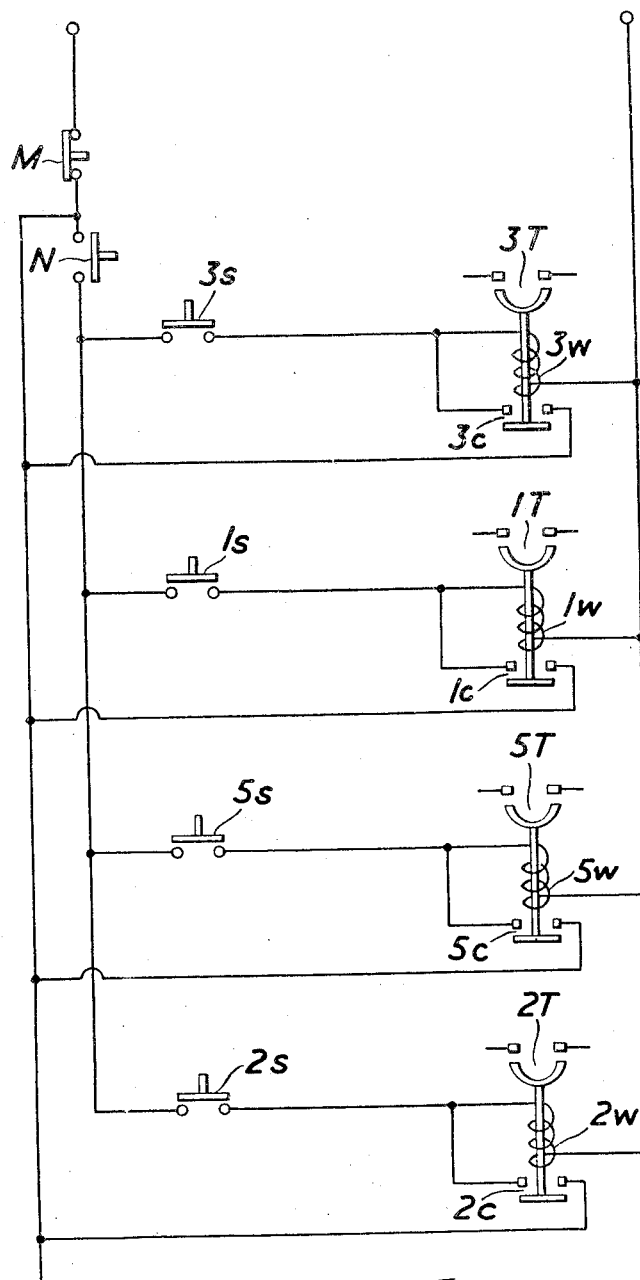
Figure 5 is a diagram illustrating the circuit connections of the apparatus.

Referring to the drawings a number of dogs 1, 2, 3, 4, 5 are carried by the work table 6, said dogs being spaced in a horizontal row in the line of feed. As said table moves, the dogs successively engage the top 7a of a single vertical plunger rod 7 and thereby, by a cam action, press it down, the rod returning by a spring bias immediately each dog has passed. Each

2 dog is capable of pressing the plunger rod down when the table is moving in one direction only. When the dog engages the plunger rod with the table moving in the other direction, said dog is capable of yielding pivotally about a pin 8 so that it rides past the plunger rod without pressing it down.

The several dogs 1, 2, 3, 4, 5 push the plunger rod 7 down to different low levels, and, according to the low level to which the plunger rod is pushed down, electric circuit connections are established to initiate a given rate and direction of travel of the table 6 or to stop said table.

In the arrangement being described, there are five dogs which push the plunger rod down to five different levels, viz., a "stop" dog 4 which pushes said plunger rod down to the highest level and thereby stops said table, a feed-left dog 5 which pushes said plunger rod down to the next lower level and thereby initiates movement of the table to the left at feeding speed, a quick travel right dog 3 which pushes said plunger rod down to the next lower level and thereby initiates movement of the table to the right at high speed, a quick-travel-left dog 2 which pushes the plunger rod down to the next lower level and thereby initiates movement of the table to the left at high speed, and a feed-right dog 1 which pushes the plunger rod down to the lowest level and thereby initiates movement of the table to the right at feeding speed. Each of these dogs 1, 2, 3, 4 and 5 can be located at any position along the horizontal line, and can be arranged either way round, so that the direction of movement of the table 6 at which said dog is operative may be selected. It will be seen that by selecting the required dogs and locating them at the required positions and the required way round any cycle of movements can be preselected.

The table 6 is adapted to be driven alternatively by two motors (not shown), viz., a feed motor and a quick traverse motor, each of said motors being controlled by means of two contactors one for forward and one for reverse operation. The arangement could be such that both motors are normally uncoupled from the table and simultaneously with the energisation of either motor by closure of either of its controlling contactors, an electromagnetic clutch is energised for coupling said motor for driving the table.

Thus there are four contactors, viz., a feed right contactor 1T, a feed left contactor 5T, a quick travel right contactor 3T and a quick travel left contactor 2T. The feed right contactor has a winding 1w, the quick travel left contactor a winding 2w, the quick travel right contactor a winding 3w, and the feed left contactor a winding 5w. Each of these contactors is closed when its winding is energised.

The contactor windings 1w, 2w, 3w and 5w have respective operating switches 1s, 2s, 3s and 5s in series with them, and also have respective maintaining contacts 1c, 2c, 3c and 5c in series with them by another path. All the paths energising the contactor windings 1w, 2w, 3w, 5w through the operating switches 1s, 2s, 3s, 5s are supplied in common through a normally closed main switch and a normally open main switch N in series. All the paths energising the contactor windings 1w, 2w, 3w, 5w through their maintaining contacts 1c, 2c, 3c, 5c are supplied in common through the normally closed main switch M only.

Mounted so as to be longitudinally slidable relative to said plunger rod 7 is a slide 9. Said plunger rod is biased upwardly, by means of a lever 10 engaging its lower end, to a limiting position determined by a shoulder 11 on said plunger rod engaging a fixed plate 12. Said slide 9 is independently biased upwardly, by means of a lever 13 engaging its lower end, to a limiting position relative to said plunger rod 7, determined by the upper end of said slide engaging a shoulder 14 on said plunger rod.

The operation of the device is as follows: Assuming that both the plunger rod 7 and the slide 9 are at their limiting up positions, when a dog 1, 2, 3 or 5 presses the plunger rod 7 downwards, it presses the slide 9 downwards also. As the slide 9 moves down studs 15 and 16 thereon coact at four different levels of said slide with the four different operating switches 1s, 2s, 3s, 5s, and each operating switch is thereby closed only so long as said slide 9 is at the appropriate level for said switch. When said slide 9 reaches the low level determined by the particular dog 1, 2, 3 or 5 which is operating, the operating switch 1s, 2s, 3s or 5s corresponding to said dog will be closed but owing to the normally open main switch N being open, this will not at this time effect energisation of the corresponding contactor winding 1w, 2w, 3w or 5w. In like manner any other operating switch which may have been temporarily closed during the descent of said slide 9 will have been without effect. When the plunger rod 7 now begins to ascend, the slide 9 is maintained down by means of a latch 17 coacting with a ratchet 18 on said slide and the plunger rod 7 ascends without said slide. When said plunger rod 7 reaches the top of its stroke a stud 19 thereon coacts with the normally open main switch N and closes it and thereby completes the energising circuit for the aforesaid corresponding contactor winding 1w, 2w, 3w or 5w. The normally closed main switch M is momentarily opened just before the plunger rod 7 reaches the top of its stroke for a purpose which will hereinafter appear.

Assuming now that a given contactor winding 1w, 2w, 3w or 5w has been energised in this way, say the quick-traverse-right contactor winding 3w, this winding will be energised through the quick-traverse-right operating switch 3s and also through its own maintaining contacts 3c. If now the plunger rod 7 makes another descent to another level for, say, energising the winding 5w of the feed-left contactor, immediately said plunger rod 7 commences to descend the normally open main switch N will be opened leaving the winding 3w of the quick-traverse-right contactor energised only through the normally closed main switch M and its maintaining contacts 3c. Just after the plunger rod commences its descent, the latch 17 is actuated, as will hereinafter appear, to unlatch the slide 9 and the latter springs up to its limiting position relative to the plunger rod 7 and thereafter descends with said plunger rod. When said slide 9 reaches the new low position, it closes the operating switch 5s for the new winding 5w, that is the winding of the feed-left contactor, but, as before described, said winding 5w remains de-energised owing to the normally open main switch N being open. As before said slide 9 remains latched down by the latch 17 and the plunger rod 7 makes its ascent alone. Just before said plunger rod 7 reaches the top of its stroke, the normally closed main switch M is, as before stated, momentarily opened, and thereby the circuit of the old winding, that is the winding 3w of the quick-traverse-right contactor is de-energised through its maintaining contacts 3c and falls out. Immediately afterwards, when the plunger rod 7 reaches the top of its stroke, the normally open main switch N is closed as before and the new winding, that is the winding 5w of the feed-left contactor is energised.

It will thus be seen that, each time the plunger rod 7 descends and ascends, the appropriate contactor winding, determined by the low limit of the descent, is energised upon the completion of the ascent, and, just before the completion of the ascent, the contactor winding, which was energised by the preceding descent and ascent, is de-energised. Thus immediately before each new selected contactor is closed, the preceding selected contactor is opened.

As above stated, just before the plunger rod 7 reaches the top of its stroke while ascending, the normally closed main switch M is momentarily opened, but said normally closed main switch must not be momentarily opened when said plunger rod reaches the same position while descending. To provide for this said plunger rod has a pin 20 passing horizontally through it with an operating head 20a projecting on one side and a tail 20b projecting on the other side. Said pin is biased axially to a limiting position at which the tail 20b projects a considerable distance and the operating head 20a hardly at all. Shortly after the plunger rod has commenced descending the projecting tail 20b of said pin 20 engages a top surface 21a of a pivoted cam element 21 and presses said cam element about its pivot 22 against a spring bias set up by a spring 23 said cam element 21 springing back when said tail of said pin has passed. Thus the operating head 20a of said pin remains retracted and is without effect on the normally closed main switch M.

When, however, said plunger rod 7 nears the top of its stroke during its ascent the tail 20b of said pin 20 engages an underneath inclined cam surface on said cam element 21 as will be clear from the drawing, and, since said cam element cannot pivot in the other direction owing to a stop 24 said pin 20 is forced by said cam surface in opposition to its spring bias and its operating head 20a projects, and operates, as said plunger rod passes through the appropriate position, to momentarily open said normally closed main switch M.

As before stated, just after the plunger rod 7 leaves the top of its stroke when descending, it unlatches the latch 17 which latches the slide 9 down, but it must not unlatch said latch just before it reaches the top of its stroke when ascending. To provide for this, said plunger rod has a cam element 25 pivotally mounted on an arm 26 which is rigid with said plunger rod. When the plunger rod is ascending and nears the top of its stroke, an upper surface 27 of said cam element 25 engages a projection 28 on said latch, and thereby said cam element is pivoted about its pivot pin 29 in opposition to a spring bias set up by a spring 30 and rides past said projection, without moving the latch 17, and then springs back to its normal pivotal position. Shortly after said plunger rod 7 has left the top of its stroke when descending, an under cam surface 31 on said cam element 25 engages the same projection 28 on said latch 17, and, as said cam element cannot pivot upwardly owing to a stop 32, said cam surface forces said latch about its pivot pin 33 to the unlatched position. The reference 34 designates the spring which biases said latch to the latching position.

When the plunger rod 7 is pressed down by the stop dog 4 it is not pressed down far enough for any of the operating switches 1s, 2s, 3s or 5s to be closed, and thus no new selected contactor is closed when the plunger rod subsequently completes its ascent. Also, the slide 9 is not pressed far enough down to be latched down, and therefore it ascends with the plunger rod 7. The descent of said plunger rod 7 is, however, sufficiently far that, just before it completes its ascent, the normally closed main switch M is momentarily opened, by the head 20a as heretofore described, and thus the contactor which was energized by the preceding descent and ascent is de-energized and falls out.

Each of the four operating switches 1s, 2s, 3s and 5s and also the two main switches M and N is of the type having a plunger which is moved in opposition to a bias to close or open the switch as the case may be. A small pivoted arm has its inner side resting against the end of each plunger and is moved about its pivot to press said plunger in opposition to its bias.

The studs 15, 16, 19 (or pin-head 20a) engage the outer sides of these arms to effect their movement for actuating the switches. To avoid confusion, references have not been applied to the plunger of the operating switches or to the pivoted arms, but it is thought that these are quite clear from Figure 1 of the drawings. It will be appreciated that the stud 15 on the slide 9 actuates the switches 3s and 1s. The stud 16 on said slide actuates the switches 5s and 2s.

It will be seen that as there is only one plunger rod 7, all that the presetting operation involves is the correct location and orientation of the five dogs, or the less than five dogs which may be required. There may of course be more than five dogs to produce a given cycle but in the particular embodiment described there will not be more than the five types of dogs.

Dealing now with certain constructional details, it will be seen that each dog 1, 2, 3, 4, 5 is mounted by means of its pivot pin 8 on a base member 35 which in turn is adapted to be rigidly mounted on the table 6 by means of a screw 36. More particularly the surface of the table 6 on which the base member 35 is mounted has a T-section slot 37 formed therein. The base members 35 are each formed on its back surface with a tongue 38, and the several tongues engage slidably in the narrow portion of said T-section slot 37. Each screw 36 passes from the front through the base member 35 and the tongue 38 at the back, and enters the wide portion of the T-section slot, where it makes screwed engagement with a square nut 39 which fits in said wide portion. It will be seen that when each screw 36 is screwed tight into said nut 39 by means of its hexagonal head at its front end the base member 35 will be rigidly locked to the table, and, when said screw 36 is loosened, the base member 35 can be slid along the T-section slot 37 to any selected position. By screwing a screw 36 entirely out of the nut 39 the base member can be removed and the nut 39 can be slid out of the end of the slot.

Each dog 1, 2, 3, 4, 5 has a slanting cam surface 40, and when this surface engages the top 7a, of the plunger rod 7, the dog is prevented from yielding about its pivot pin 8, by the engagement of a tail portion of said dog with a stop 41 mounted on the base member 35. Therefore the plunger rod is forced downwards as the dog passes its upper end. On the other side said dog has a vertical surface 42, and when this surface engages the top of the plunger the dog is free to yield about its pivot 8, and therefore it rides past the top of the plunger without depressing it.

It will be seen that the lower portion of the plunger rod 7, the slide 9, the operating switches M, N, 1s, 2s, 3s, 5s, and all the other mechanism associated with the plunger and slide are housed in a housing constituted by a machined block 43 and a machined front cover plate 44 therefor (removed in Figure 1), said block and cover plate being formed with recesses which constitute locating enclosures for the said parts. More particularly it may be pointed out that the front face of the block 43 has cut in it a vertical square section slot 45 which is closed by the cover plate 44. Both the plunger rod 7 and the slide 9 slide longitudinally in this square section slot, said plunger rod having portions above and below the slide which are of the same square section and having an intermediate portion which is reduced to a smaller rectangular section as best shown in Figures 1 and 4. The slide is of the same square section but with a longitudinal slot in it whereby it mates with the reduced portion of the plunger rod as shown in Figure 4. The aforesaid shoulder 14 is constituted by the upper termination of the reduced intermediate portion of the plunger rod. The aforesaid plate 12 is a top cover plate for the block 43.

Figure 6:
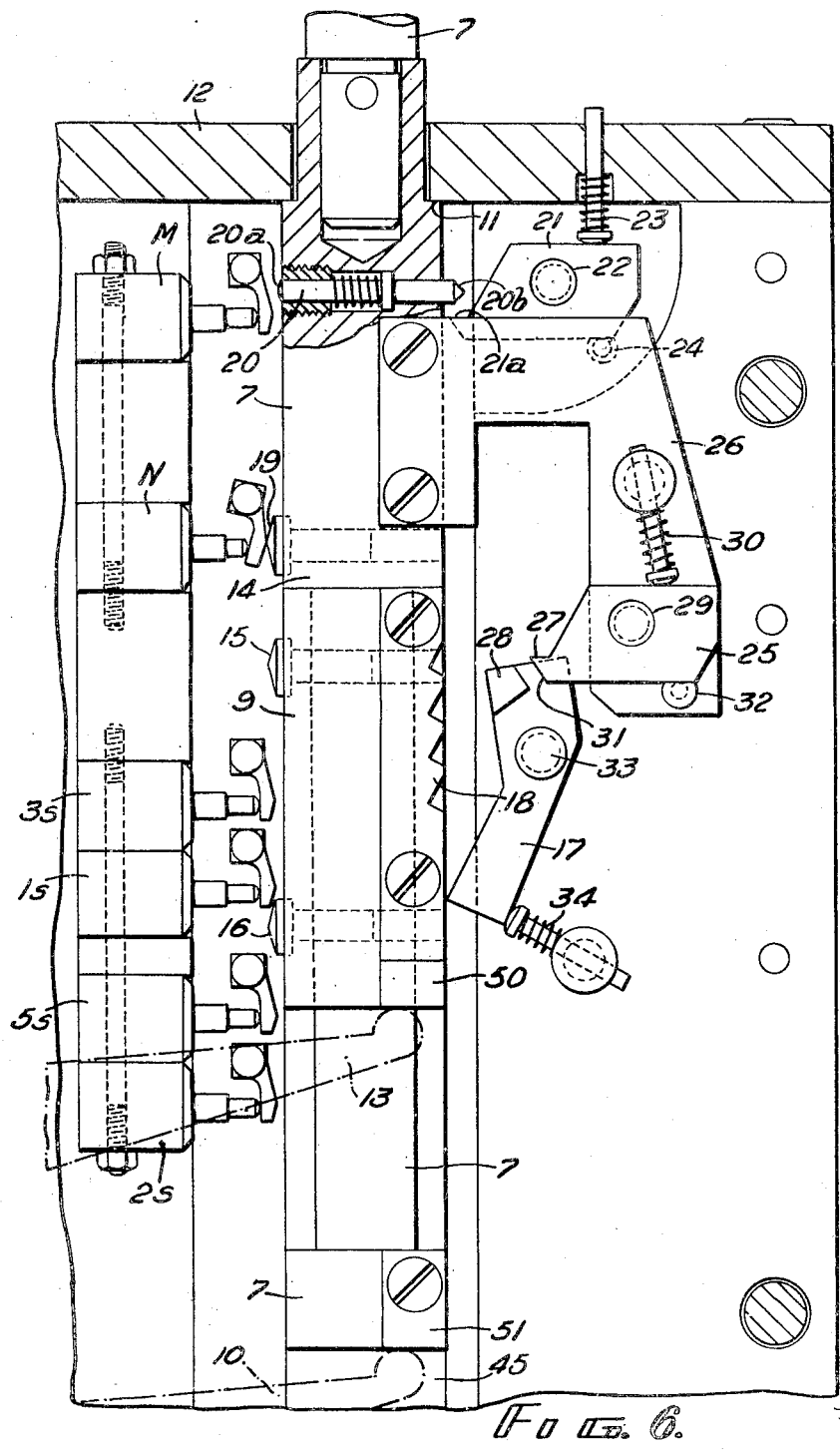
Figure 6 is a view to a larger scale of a part of Figure 1.

As will be clear from Figures 6, 2 and 4, the levers 13 and 10 are mounted on the outside of the cover plate 44 on respective pivot pins 46 and 47. Said levers are biased by means of respective springs 48 and 49. The cover plate 44 is stepped as best shown in Figure 4 and the levers 13 and 10, while extending in general parallel to said cover plate, enter recesses in the stepped portion of said cover plate. The slide 9 at its lower end, and the plunger rod 7 at its lower end, have respective lateral projections 50 and 51, and the ends of the levers 13 and 10 engage respectively under said projections 50 and 51 as shown, and thereby bias the slide and plunger rod upwardly as shown.

It is deemed that the manner in which the remaining components are mounted in the recesses formed by the block 43 and the cover plate 44 is sufficiently clear from the drawings.

As clearly shown, the sliding table 6 is mounted on a fixed base 52. The housing formed by the parts 43 and 44 is mounted on a vertical plate 53 secured to said base 52. The reference 54 (Figure 2) designates a cover for the dogs and associated parts.

We claim:

1. Electric circuit controlling apparatus comprising a plurality of controlled circuits to be selected, a control element adapted to be moved from a normal position along a given path to any of a plurality of selecting positions at different distances and back again, and means whereby, in response to each reciprocation of said control element to a selecting position and back, a controlled circuit corresponding to said selecting position is established and any circuit which was established in response to an immediately preceding reciprocation is disestablished.

2. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, and means whereby, in response jointly to the said retention of said follower element and to the said return movement of said control element, the control circuit corresponding to said final selecting position reached by said control element is established.

3. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, means whereby, in response jointly to the said retention of said follower element and to the said return movement of said control element, the control circuit corresponding to said final selecting position reached by said control element is established, and means whereby, upon said control element making a second movement from said normal position towards said selecting positions, said follower element returns to conformity with said control element, so that upon said control element continuing said second movement to a second selecting position and then making its return movement, a second controlled circuit is established in like manner as the first.

4. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, means whereby, in response jointly to the said retention of said follower element and to the said return movement of said control element, the control circuit corresponding to said final selecting position reached by said control element is established, means whereby, upon said control element making a second movement from said normal position towards said selecting positions, said follower element returns to conformity with said control element, so that upon said control element continuing said second movement to a second selecting position and then making its return movement, a second controlled circuit is established in like manner as the first, and means for maintaining the first controlled circuit and disestablishing the same in response to said control element making its return movement from said second selecting position.

5. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, means whereby, in response jointly to the said retention of said follower element and to the said return movement of said control element, the control circuit corresponding to said final selecting position reached by said control element is established, means whereby, upon said control element making a second movement from said normal position towards said selecting positions, said follower element returns to conformity with said control element, so that upon said control element continuing said second movement to a second selecting position and then making its return movement, a second controlled circuit is established in like manner as the first, and means for maintaining the first controlled circuit and disestablishing the same in response to said control element making its return movement from said second selecting position, the disestablishment of the first controlled circuit being effected just prior to the establishment of the second.

6. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, normally open selecting switches corresponding respectively to said controlled circuits, means whereby each selecting switch is adapted to be held closed in response to said follower element being at the position corresponding thereto, a common main switch, means whereby said main switch is closed in response to said control element being at the normal position, and means whereby each controlled circuit is established in response to the closure both of the corresponding selecting switch and of said main switch.

7. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, normally open selecting switches corresponding respectively to said controlled circuits, means whereby each selecting switch is adapted to be held closed in response to said follower element being at the position corresponding thereto, a common main switch, means whereby said main switch is closed in response to said control element being at the normal position, means whereby each controlled circuit is established in response to the closure both of the corresponding selecting switch and of said main switch, means whereby, upon said control element making a second movement from said normal position towards said selecting positions, said follower element returns to conformity with said control element, so that upon said control element continuing said second movement to a second selecting position and then making its return movement, a second controlled circuit is established in like manner as the first, maintaining contacts for each controlled circuit adapted to be closed in response to said controlled circuit being established to thereby maintain said controlled circuit independently of its selecting switch and said main switch, a second main switch, means whereby, in response to the return movement of said control element to the normal position, said second main switch is opened, and means whereby, in response to said second main switch opening, any controlled circuit which is maintained through its maintaining contacts is interrupted.

8. Electric circuit controlling apparatus, comprising a plurality of controlled circuits to be selected, a control element adapted to be moved from a normal position along a given path to any of a plurality of selecting positions, at different distances, and back again, a follower element associated with said control element, means whereby said follower element is constrained to move in conformity with said control element as the latter moves from the normal position to said selecting positions, means whereby said follower element is adapted, upon said control element making its return movement, to be retained at the position corresponding to the final selecting position reached by said control element, normally open selecting switches corresponding respectively to said controlled circuits, means whereby each selecting switch is adapted to be held closed in response to said follower element being at the position corresponding thereto, a common main switch, means whereby said main switch is closed in response to said control element being at the normal position, means whereby each controlled circuit is established in response to the closure both of the corresponding selecting switch and of said main switch, means whereby, upon said control element making a second movement from said normal position towards said selecting positions, said follower element returns to conformity with said control element, so that upon said control element continuing said second movement to a second selecting position and then making its return movement, a second controlled circuit is established in like manner as the first, maintaining contacts for each controlled circuit adapted to be closed in response to said controlled circuit being established to thereby maintain said controlled circuit independently of its selecting switch and said main switch, a second main switch, means whereby, in response to the return movement of said control element to the normal position, said second main switch is opened, means whereby, in response to said second main switch opening, any controlled circuit which is maintained through its maintaining contacts is interrupted, the opening of said second main switch, as the control element returns to the normal position, being only momentary, and means to prevent a corresponding momentary opening of said second main switch as said control element moves out of said normal position.

9. Electric circuit controlling apparatus, comprising a plurality of controlled circuits to be selected, a control element adapted to be moved from a normal position along a given path to any of a plurality of selecting positions, at different distances and back again, a follower element movable in the same path, means biasing said follower element towards the normal position so as to abut against said control element, whereby said follower element is adapted to be pressed from said normal position as said control element moves from said normal position to said selecting positions, latch means whereby said follower element is adapted, upon said control element making its return movement, to be retained at the position corresponding to the final selecting position reached by said control element, means whereby, in response jointly to the said retention of said follower element and to the said return movement of said control element, the control circuit corresponding to said final selecting position reached by said control element is established, and means whereby, upon said control element making a second movement from said normal position towards said selecting positions, said latch means are actuated to release said follower element whereby said follower element returns to abutment with said control element, so that, upon said control element continuing said second movement to a second selecting position and then making its return movement, a second controlled circuit is established in like manner as the first.

JAMES SELBY.
GERHARD OTTO ISAAC KRIEGER.

REFERENCES CITED

The following references are of record in the file of this patent:

UNITED STATES PATENTS

| Number | Name | Date |
|---|---|---|
| 2,139,295 | Woodling | Dec. 6, 1938 |